(12) United States Patent
Kantani et al.

(10) Patent No.: US 6,253,153 B1
(45) Date of Patent: Jun. 26, 2001

(54) VEHICLE NAVIGATION SYSTEM AND METHOD

(75) Inventors: Masakatsu Kantani, Tama; Hiroshi Shinada, Tokyo, both of (JP)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/191,038

(22) Filed: Nov. 12, 1998

(51) Int. Cl.[7] .................................................. G06F 17/00
(52) U.S. Cl. ............................................. 701/209; 701/211
(58) Field of Search .................................... 701/200, 201, 701/202, 206, 207, 208, 209, 210, 211, 213; 342/357.13

(56) References Cited

U.S. PATENT DOCUMENTS

| | | | |
|---|---|---|---|
| 4,937,751 | 6/1990 | Nimura et al. | 701/211 |
| 4,939,662 | 7/1990 | Nimura et al. | 701/211 |
| 5,243,528 | 9/1993 | Lefebvre | 701/211 |
| 5,323,321 | 6/1994 | Smith, Jr. | 701/211 |
| 5,394,332 | 2/1995 | Kuwahara et al. | 701/211 |
| 5,416,478 | 5/1995 | Morinaga | 340/995 |
| 5,587,911 | 12/1996 | Asano et al. | 701/202 |
| 5,608,635 | 3/1997 | Tamai | 701/209 |
| 5,638,279 | 6/1997 | Kishi et al. | 701/200 |
| 5,654,892 | 8/1997 | Fujii et al. | 701/211 |
| 6,084,543 | * 7/2000 | Iizuka | 342/357.13 |

* cited by examiner

Primary Examiner—William A. Cuchlinski, Jr.
Assistant Examiner—Edward Pipala
(74) Attorney, Agent, or Firm—Mark Mollon

(57) ABSTRACT

A vehicle navigation system and method indicates highly recognizable information relating to the next intersection to be turned at for a vehicle operator. The system and method determine a route between the present position and the destination, identify a next intersection to be turned at in the map data, counts a number of intersections to be passed between the present position specified by the positioning device and the next intersection to be turned at, and indicates a number relating to the counted number.

18 Claims, 3 Drawing Sheets

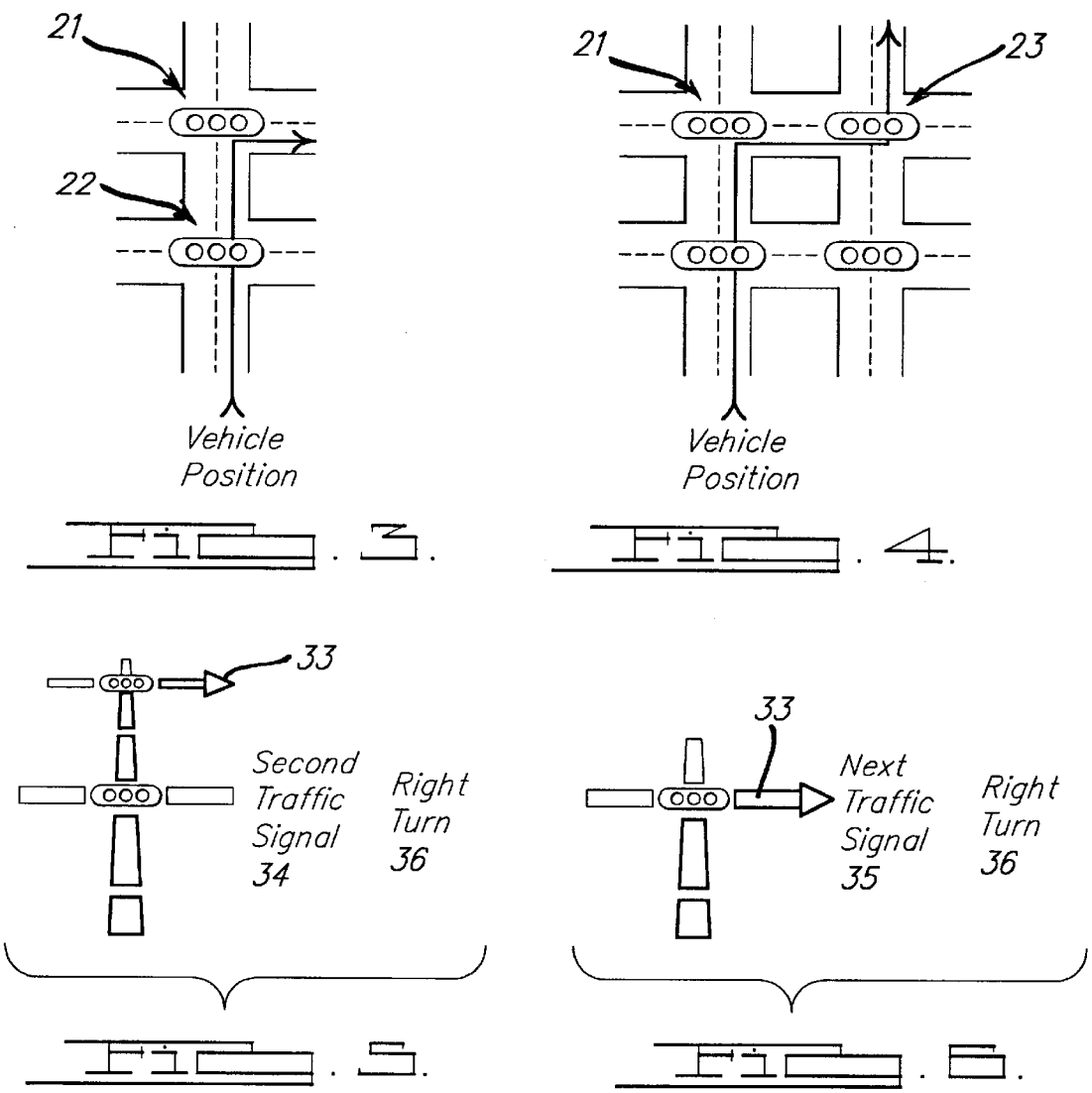
FIG. 3.
FIG. 4.
FIG. 5.
FIG. 6.
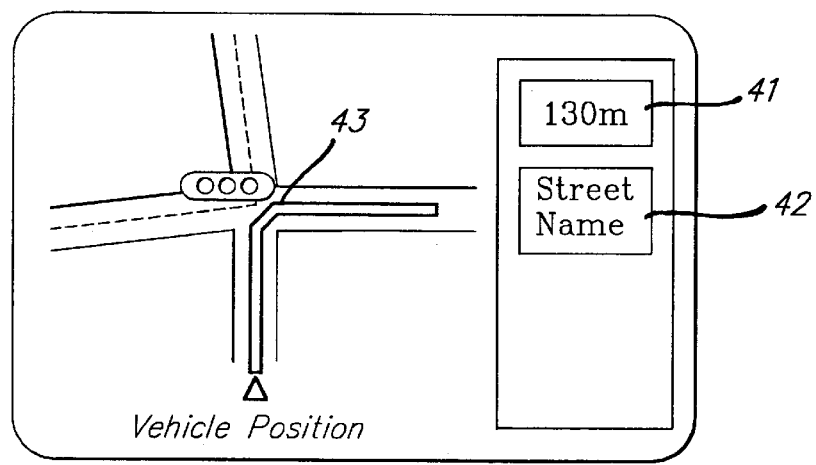
FIG. 7.

VEHICLE NAVIGATION SYSTEM AND METHOD

BACKGROUND OF THE INVENTION

The present invention relates, in general, to vehicle navigation systems and methods, and more specifically, to a system and method for indicating information relating to a next intersection to be turned at for a vehicle operator such as a driver of an automotive vehicle.

In recent years, demands for navigation systems equipped in automotive vehicles have rapidly increased due to complexity of the roads (especially in city areas) and drivers' desires for smooth flowing transportation. However, as availability of navigation systems increases, drivers having insufficient familiarity with the systems and displays increasingly becomes a problem. Therefore, a navigation system which allows anyone to easily and safely reach their destination by showing a route to the driver in an highly recognizable way is desired.

For easily recognizable and accurate route guidance, U.S. Pat. No. 5,416,478 discloses that numerical characters are added to designated intersections in a map of the route displayed on a main monitor device. The numerical character and a direction (left, right or straight) to go at the next designated intersection are also shown on display just in front of the driver which is independent from the main monitor device, and these indications are changed as the vehicle passes the designated intersection. In this patent, however, the driver has to see the map on the main monitor device in order to know how long or how far he must travel to get to the next intersection to be turned at. This is very inconvenient, because it is difficult to find out, from the map, the relative distance between the current position and the next intersection or time duration to reach the next intersection from the current position.

For providing more recognizable information to the driver, in U.S. Pat. Nos. 5,323,321 and 5,587,911, it is disclosed that the remaining distance to the next intersection to be turned at is shown with actual numerical characters, such as 130 meters.

FIG. 7 shows an example of a display according to the concept of the prior art disclosed in the '321 and '911 patents. An indication 41 of the display shows 130 meters from a present position to the next intersection to be turned at. An indication 42 of the display shows an actual name of the intersecting street to be turned on. A curved line 43 indicates a direction to be turned at the intersection.

There is still inconvenience to the driver in this prior art, for it is difficult to know how far the actual distance such as 130 meters is while driving the automotive vehicle just relying on the driver's own sense of distance. Thus, it is difficult for the driver to identify the next intersection well prior to the intersection so as to turn without confusion. Particularly in the case that two adjacent intersections are in close proximity, the distance between them might be smaller than an error of the vehicle position monitoring system, such as the global positioning system (GPS). From only the relative distance information, one cannot exactly determine which of the intersections is to be turned at because of the error of the positioning system.

To solve this problem, one could provide image information, such as photographs, relating to the next intersection by reproducing image data stored in a memory device of the system, such as disclosed in U.S. Pat. No. 4,937,751, for example. However, as a practical matter, the large amount of image data requires a much larger data memory than does conventional map data. If the amount of the image data is reduced so as to minimize memory requirements, the driver cannot obtain sufficiently useful information. For example, the image of the intersection could be stored for only one direction of approach to the intersection. Thus, the images may be confusing when approaching the intersection from a different direction. If the amount of image data is not limited in this fashion, the system may need such an amount of time to retrieve and process the data for the display that it is difficult to supply the proper information to the driver prior to the time of the desired actual turn at the intersection.

SUMMARY OF THE INVENTION

Responsive to the deficiencies in the prior art, it is an object of the present invention to provide a vehicle navigation system and method which can supply the vehicle operator highly recognizable information relating to the next intersection to be turned at, well prior to the timing of the actual turn.

To achieve this object, according to a first aspect of the present invention, there is provided a vehicle navigation system comprising a controller, a positioning device which specifies a present position of the vehicle and inputs the present position into the controller, an input device through which a vehicle operator inputs a destination into the controller, map data including a database of roads which is read by the controller, and an indicator which indicates information for the vehicle operator and which is controlled by the controller. In this system, the controller determines a route between the present position specified by the positioning device and the destination inputted by the vehicle operator through the input device according to the map data, identifies a next intersection to be turned at in the map data, counts a number of intersections to be passed between the present position specified by the positioning device and the next intersection to be turned at according to the map data and the determined route, and controls the indicator to indicate a number relating to the counted number.

According to a second aspect of the present invention, there is provided a navigation system for a vehicle, comprising positioning means for specifying a present position of the vehicle, input means for inputting a destination, memory means for storing map data including a database of roads, indication means for indicating an information for a vehicle operator, and control means for 1) determining a route between the present position specified by the positioning means and the destination inputted by the input means according to the map data stored in the memory means, 2) identifying a next intersection to be turned at in the map data stored in the memory means, 3) counting a number of intersections to be passed between the present position specified by the positioning means and the next intersection to be turned at according to the map data and the determined route, and 4) controlling the indication means to indicate a number relating to the counted number.

According to a third aspect of the present invention, there is provided a navigation method for a vehicle comprising the steps of specifying a present position of the vehicle, specifying a destination of said vehicle, determining a route between the present position and the destination according to map data, identifying a next intersection to be turned at in the map data, counting a number of intersections to be passed between the present position and the next intersection to be turned at according to the map data, and indicating a number relating to the counted number for a vehicle operator.

According to a preferred embodiment of the present invention, the counted number of the intersections to be passed before the next intersection to be turned at is based only on intersections having traffic signals.

According to another feature of the present invention, the indicator indicates the turning direction at the next intersection to be turned.

According to still another feature of the present invention, the indicated number is the counted number of the intersections plus one.

According to still another feature of the present invention, the indicated information is visual and/or aural.

An advantage of the present invention is that the vehicle operator can easily get highly recognizable information relating to the next intersection to be turned at, because the invention system and method count the number of intersection to be passed before the intersection to be turned at and indicate the number relating the counted number for the vehicle operator. According to the indicated information, the driver will easily identify the actual intersection to be turned at well in advance of the actual turn.

BRIEF DESCRIPTION OF THE DRAWINGS

FIGS. 3 and 4 are diagrams showing situations of a vehicle moving along a route.

FIGS. 5 and 6 are diagrams showing displays indicating information relating an intersection to be turned at according to the present invention.

FIG. 7 is a diagram showing a display according to the prior art.

DETAILED DESCRIPTION OF PREFERRED EMBODIMENTS

Figure 1:
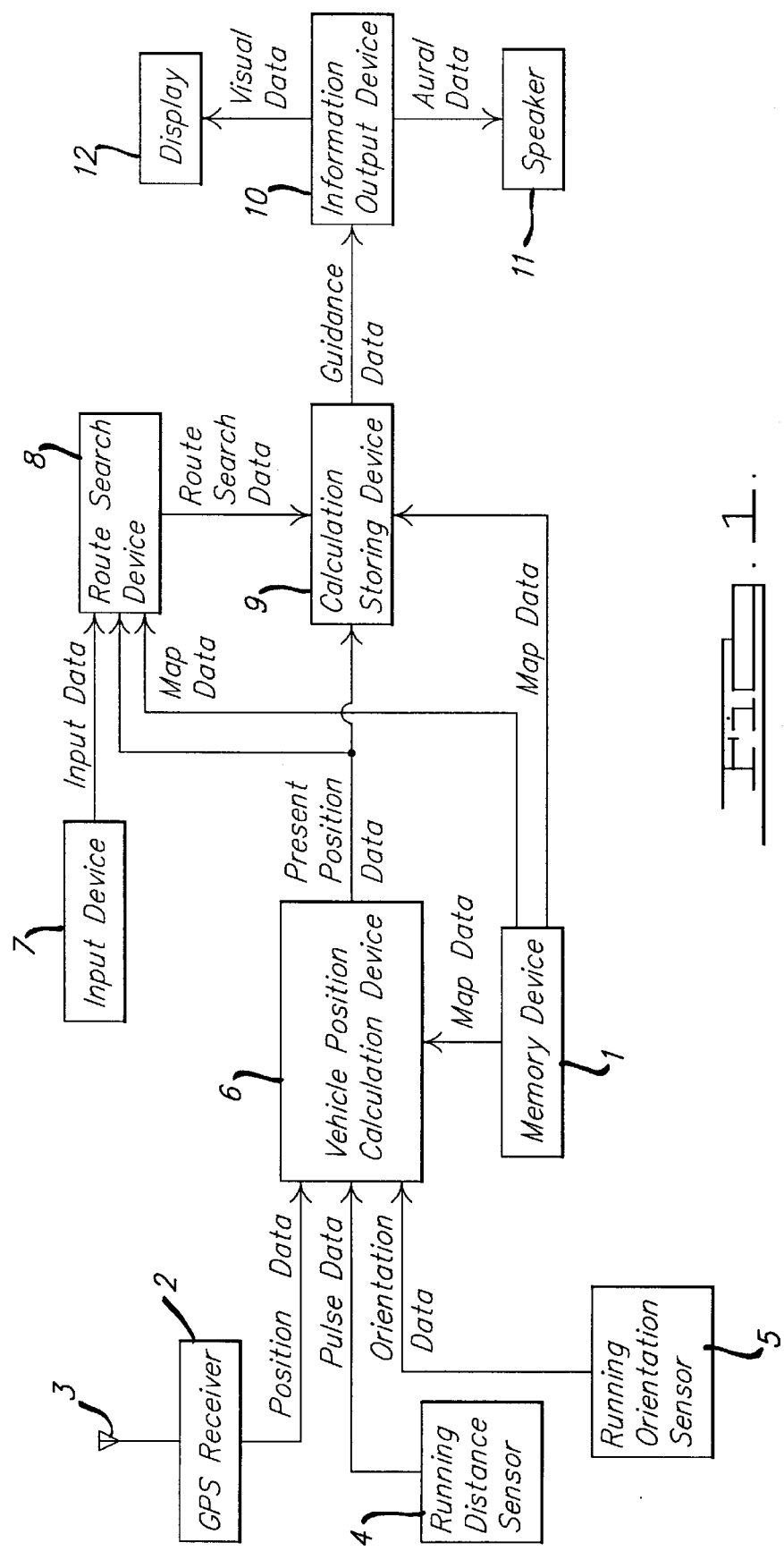
FIG. 1 is a block diagram showing a vehicle navigation system according to the present invention.

An embodiment of the present invention with reference to the attached drawings will now be described. FIG. 1 is a block diagram showing a preferred embodiment of a navigation system according to the present invention.

In FIG. 1, a memory device 1 stores map data and consists of any form of storage device, such as CD-ROM which is most conventionally used in the automotive vehicle navigation art. The map data includes 1) road data including a node table showing node coordinates and attributes, a list of intersection names, and a road table; 2) background data for drawing figures on the map; and 3) character data for displaying names of cities, towns and villages, and symbols.

A receiver 2 for the global positioning system (GPS) outputs position data including longitude, latitude, and altitude for a present position of an automotive vehicle equipped with this system. GPS information is received from a plurality of GPS satellites through an antenna 3.

A running distance sensor 4 outputs a pulse data per unit running distance corresponding to the rotation of the wheels. A running orientation sensor 5 outputs an orientation data based on changes in the angular velocity using a gyroscope or other orientation device. Preferably, a gyroscope model number ENV-05D manufactured by Murata Manufacturing Co., Ltd. can be used as the running orientation sensor 5.

A vehicle position calculation device 6 calculates a running distance based on the pulse data from the running distance sensor 4 and a change in the running direction based on the orientation data obtained from the running orientation sensor 5 to determine the position of the vehicle on the plane coordinate axes. Further based on this result and calculation of the position data obtained from the GPS receiver 2, the vehicle calculation device determines possible locations for the present position. Having collated these possible locations with map data of the corresponding area obtained from the memory device 1, the vehicle position calculation device specifies one of the possible locations as the present position.

Through an input device 7, such as a keyboard or a touch panel, a vehicle operator or a driver inputs a destination. A route search device 8 calculates the optimum route from the present position to the destination for the data inputted by the input device 7 and searches for the starting point of the route and intersections to be turned at along the route based on the present position data obtained from the vehicle position calculation device 6 and environmental map data for the present position and for the destination obtained from memory device 1.

A calculation storing device 9 stores the route search data calculated by the route search device 8. Based on this data, it also calculates a number of intersections to be passed before the next intersection to be turned at (which is referred to hereafter as "turning intersection") according to the latest data of the present position obtained by the vehicle position calculation device 6 and the environmental data obtained from the memory device 1 to determine guiding locations and corresponding guidance data.

An information output device 10 processes the data of the number of the intersections to be passed before the next turning intersection based on the guidance data outputted from the calculation storing device 9. It also controls a speaker 11 and/or a visual display 12 to indicate the information according to the processed data. While through the speaker 11, aural information will be indicated, visual information such as characters and symbols will be indicated through the visual display such as a liquid crystal display or a screen mounted on the windshield of the automotive vehicle for which the image is projected by a projector mounted in the instrument panel.

Figure 2:
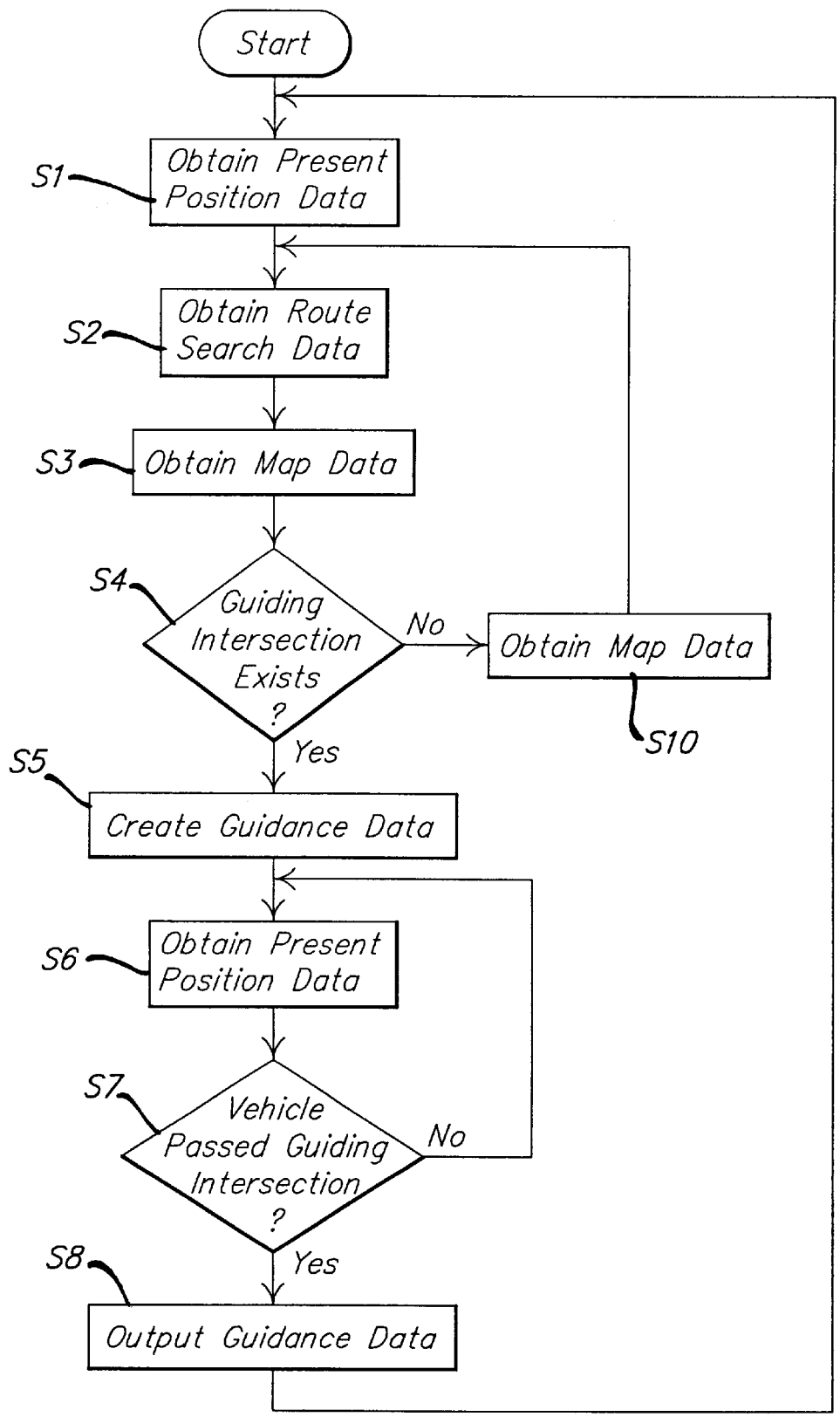
FIG. 2 is a flowchart for processing guidance data in the vehicle navigation system of FIG. 1.

FIG. 2 is a flowchart illustrating the calculation storing device 9 creating the guidance data corresponding to the guiding point.

In FIG. 2, the most recent position data is firstly obtained from the vehicle position calculation device 6 at step one (S1). Guiding intersections are those that must be passed through on the way to the turning intersection and that will be counted in the turning instructions given to the driver. At S2, the closest one of the guiding intersections to the present position is retrieved from among the route data determined by route search device 8. Guiding locations refers to areas just before and/or after guiding intersections where turning instructions may be given. The environmental map data of the present position is obtained from the memory device 1 at S3. At S4, it is determined whether the guiding intersection searched for at S2 exists within the environmental map data obtained at S3. If the guiding intersection does not exist in the environmental data, the present position data is again obtained at S10 and the process returns to S2. On the other hand, if the guiding intersection exists in the environmental data, the process is advanced to next calculation for confirmation that the vehicle has reached to the guiding location. The guidance data is created from the route search data corresponding to the guiding location at S5. Then at S6, the latest present position data is obtained from the vehicle position calculation device 6. At S7, it is determined whether the vehicle has passed the guiding intersection. If it is confirmed that the vehicle has passed the guiding intersection from the latest present position data such that there is no intersection to be passed prior to the guiding location, the guidance data is outputted at S8 to start the guidance. The guidance data corresponds to the number of guiding intersections remaining before the turning intersection, for example. On the other hand, if the vehicle has not passed the guiding intersection, the process is returned to S6 for obtaining the latest present position data.

This guidance provides the driver the number of intersections to be passed before the turning intersection using the speaker 11 and/or the display 12. In FIG. 3, for example, the number of intersections between the present position and the next turning intersection 21 is one. A guidance instruction is given such as "turn right at the second intersection" while at this position. A guidance instruction indicating two intersections is necessary. In other words, the indicated number is always the number of intersections to be passed between the current position and the next turning intersection plus one. Preferably, a guidance instruction is given at least twice. Thus, the next guidance instruction will be "turn right at the next intersection" after passing the intersection 22 shown in FIG. 3.

But in case that the two intersections 21 and 22 are located very closely with each other, it is preferable that only the first guidance such as "turn right at the second intersection" is indicated, because the second guidance such as "turn right at the next intersection" might cause some confusion due to the error of the vehicle position calculation device 6. Those skilled in the art will design this system so that the indication pattern changes depending on the form of the roads.

For example, although in the above embodiment, all intersections in the map data are examined, guidance instructions of the present invention take account only of intersections with traffic signals so that minor information does not bother the driver. Then in such a case, the only guidance instruction will be "turn right at the second signal".

FIG. 4 shows the case that left turning intersection 23 is just after the right turning intersection 21. In this case, the guidance will be such as "turn right at the next intersection and turn left at the intersection thereafter." If from the map data it is apparent that the turning intersection is named and its name is indicated at the actual location, the guidance can preferably include the name of the intersection.

FIGS. 5 and 6 show examples of display 12 according to the present invention. The display in FIG. 5 shows the guidance instruction (i.e., graphic) when the next turning intersection is the second intersection based on the present position on the road to be driven by the vehicle. The display in FIG. 6 shows the guidance instruction when the turning intersection is the next intersection. A running direction arrow 33 indicates turning direction at the turning intersection by a symbol. Guidance characters 34 indicate that the next turning intersection is the second intersection which has a traffic signal. Similar to this, guidance characters 35 indicate the next turning intersection is the next intersection which has a traffic signal. Guidance characters 36 indicate the turning direction in words. In this case, if the turning street has been named as described above, the name can be displayed simultaneously.

As is apparent from the description of the embodiments according to the navigation system of the present invention, the guidance to the turning intersection uses the number of the intersections or the traffic signals to be passed and does not use the distance; the guidance phrase is very clear and is not affected by the error of the positioning system; and the vehicle operator or the driver can easily recognize the turning intersection along the route to the destination. Thus, the driver can safely reach the destination without need of depending on their own sense of distance or the vehicle trip meter.

What is claimed is:

1. A navigation system for a vehicle, comprising:
   a controller;
   a positioning device which specifies a present position of said vehicle and inputs the present position into said controller;
   an input device through which a vehicle operator inputs a destination into said controller;
   map data including road information which is read by said controller; and
   an indicator which indicates information for said vehicle operator and which is controlled by said controller; wherein said controller determines a route between the present position specified by said positioning device and the destination inputted by said vehicle operator through said input device according to said map data, identifies a next intersection to be turned at in said map data, counts a number of guiding intersections to be passed between the present position specified by said positioning device and the next intersection to be turned at according to said map data and said determined route, controls said indicator to indicate a number relating to the counted number, updates said present position during travel of said vehicle, counts an updated number of guiding intersections remaining until said intersection to be turned at, and controls said indicator to indicate said updated number.

2. A navigation system as claimed in claim 1, wherein said counted number of the intersections to be passed before the next intersection to be turned at is based on only intersections having traffic signals.

3. A navigation system as claimed in claim 1, wherein said controller further identifies a turning direction at the next intersection to be turned and controls said indicator to indicate the identified direction.

4. A navigation system as claimed in claim 1, wherein the number indicated by said indicator is the counted number plus one.

5. A navigation system as claimed in claim 1, wherein said indicator displays said indicated number visually.

6. A navigation system as claimed in claim 1, wherein said indicator produces said indicated number aurally.

7. A navigation system for a vehicle, comprising:
   positioning means for determining a present position of said vehicle;
   input means for inputting a destination;
   memory means for storing map data including road information;
   indication means for indicating information for a vehicle operator; and
   control means for determining a route between the present position specified by said positioning means and the destination inputted by said input means according to said map data stored in said memory means, identifying a next intersection to be turned at in said map data stored in said memory means, counting a number of guiding intersections to be passed between the present position specified by said positioning means and the next intersection to be turned at according to said map data and said determined route, controlling said indication means to indicate a number relating to the counted number, updating said present position during travel of said vehicle, counting an updated number of guiding intersections remaining until said next intersection to be turned at, and controlling said indication means to indicate said updated number.

8. A navigation system as claimed in claim 7, wherein said counted number of the intersections to be passed before the next intersection to be turned at is based on only intersections having traffic signals.

9. A navigation system as claimed in claim 7, wherein said control means further includes means for identifying a turning direction at the next turning intersection, and means for controlling said indication means to indicate the identified direction.

10. A navigation system as claimed in claim 7, wherein the number indicated by said indication means is the counted number plus one.

11. A navigation system as claimed in claim 7, wherein said indication means displays said number visually.

12. A navigation system as claimed in claim 7, wherein said indication means produces said number aurally.

13. A navigation method for a vehicle comprising the steps of:
    specifying a present position of said vehicle;
    specifying a destination of said vehicle; determining a route between the present position and the destination according to map data;
    identifying a next turning intersection to be turned at in said map data;
    counting a number of guiding intersections to be passed between the present position and the next turning intersection according to said map data;
    indicating a number relating to the counted number for a vehicle operator;
    updating said present position during travel of said vehicle;
    counting an updated number of guiding intersections remaining until said next intersection to be turned at; and
    indicating said updated number.

14. A navigation method as claimed in claim 13, wherein said counted number of the intersections to be passed before the next turning intersection is based on only intersections having traffic signals.

15. A navigation method as claimed in claim 13 further comprising the steps of:
    identifying a turning direction at the next intersection to be turned; and
    indicating the identified direction.

16. A navigation method as claimed in claim 13 wherein, the number indicated by said indication step is the counted number plus one.

17. A navigation method as claimed in claim 13 wherein the number indicated by said indication step is visual information.

18. A navigation method as claimed in claim 13, wherein the number indicated by said indication step is aural information.

* * * * *